(12) United States Patent
Yang

(10) Patent No.: US 8,257,220 B2
(45) Date of Patent: Sep. 4, 2012

(54) CLUTCH TYPE REVERSIBLE TRANSMISSION BICYCLE WITH BIDIRECTIONAL INPUT AND ONE-WAY OUTPUT

(76) Inventor: Tai-Her Yang, Dzan-Hwa (TW)

( * ) Notice: Subject to any disclaimer, the term of this patent is extended or adjusted under 35 U.S.C. 154(b) by 31 days.

(21) Appl. No.: 12/699,104

(22) Filed: Feb. 3, 2010

(65) Prior Publication Data

US 2011/0185848 A1  Aug. 4, 2011

(51) Int. Cl.
*F16H 3/44* (2006.01)
(52) U.S. Cl. .......................................... 475/287; 475/324
(58) Field of Classification Search .................. 475/281, 475/283, 287, 294, 296, 324, 329, 331
See application file for complete search history.

(56) References Cited

U.S. PATENT DOCUMENTS

| 743,867 | A | * | 11/1903 | Head | 74/363 |
| 5,531,651 | A | * | 7/1996 | Yang | 475/12 |
| 5,607,369 | A | * | 3/1997 | Yang | 475/12 |
| 6,165,099 | A | * | 12/2000 | Pieper | 475/305 |

* cited by examiner

*Primary Examiner* — Justin Holmes
(74) *Attorney, Agent, or Firm* — Bacon & Thomas, PLLC

(57) ABSTRACT

The present invention is applied to pedal vehicles, or mixture of electric and pedal vehicles, or combination of electric and pedal auxiliary vehicles, especially to a bicycle capable of being pedaled bidirectionally and driven to move in unidirectional, and through releasing the connectable or releasable clutch device, the clutch type reversible transmission bicycle with bidirectional input and one-way output is prevented from lock status.

22 Claims, 5 Drawing Sheets

CLUTCH TYPE REVERSIBLE TRANSMISSION BICYCLE WITH BIDIRECTIONAL INPUT AND ONE-WAY OUTPUT

BACKGROUND OF THE INVENTION (a) Field of the Invention

For the clutch type reversible transmission bicycle with bidirectional input and one-way output of the present invention, human's foot drives the input terminal of the human input device at forward or reverse dual rotary directions, and then the output terminal of the human input device transmits the kinetic energy to the input terminal of the clutch type reversible transmission drive device with bidirectional input and one-way output, and the output terminal of the clutch type reversible transmission drive device with bidirectional input and one-way output produces constant rotary direction output to drive the load wheel set; and when the load wheel set moves back, the reverse drive caused by back move occurs at output terminal, through releasing the connectable or releasable clutch device, the clutch type reversible transmission bicycle with bidirectional input and one-way output is prevented from being locked.

The present invention is applied to pedal vehicles, or mixture of electric and pedal vehicles, or combination of electric and pedal auxiliary vehicles, especially to a bicycle capable of being pedaled bidirectionally and driven to move in unidirectional.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The clutch type reversible transmission bicycle with bidirectional input and one-way output of the present invention is a human input device with dual rotary direction input, in which the output terminal thereof connects to the input terminal of a clutch type reversible transmission drive device with bidirectional input and one-way output, the constant rotary direction output through the output terminal of the clutch type reversible transmission drive device with bidirectional input and one-way output to drive a load wheel set; the rider chooses the direction of driving input, and makes constant rotary direction output with same or different speed ratio at different driven input direction to drive the load wheel set, and when the load wheel set moves backwards, i.e. reverse drive caused by back move occurs at the output terminal, through releasing the connectable or releasable clutch device, the clutch type reversible transmission bicycle with bidirectional input and one-way output is prevented from being locked.

Figure 1:
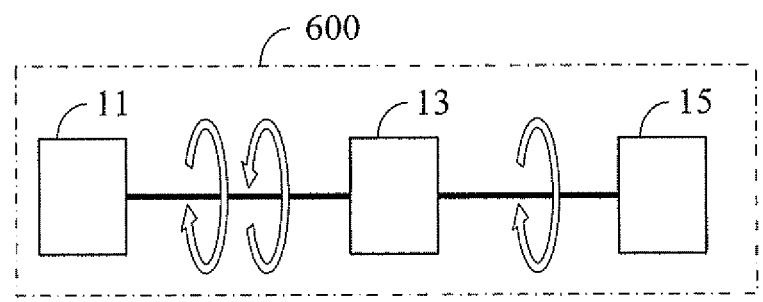
FIG. 1 is a schematic view showing the basic component blocks of the clutch type reversible transmission bicycle with bidirectional input and one-way output, according to the present invention.

DESCRIPTION OF MAIN COMPONENT SYMBOLS (11): Human input device
(12): Pre-transmission device
(13): Clutch type reversible transmission drive device with bidirectional input and one-way output
(14): Rear transmission
(15): Load wheel set
(70): Connectable or releasable clutch device
(200): Planetary wheel support arm annular shelf
(201): Planetary wheel shaft
(202): Sun wheel
(203): Planetary wheel
(204): Outer wheel,
(301), (302), (303), (305): One-way transmission
(400): Epicyclic gear support arm annular shelf
(401): Epicyclic gear shaft
(402): Inner bevel wheel
(403): Epicyclic gear
(404): Outer bevel wheel
(500): Shell of the transmission gear train
(600): Machine body
(602), (603), (605), (606), (615), (616), (617): Driving wheel (604), (618): Revolving shaft
(607): Transmission belt
(2000): Input shaft
(3000): Output shaft Detailed Description of the Preferred Embodiments The clutch type reversible transmission bicycle with bidirectional input and one-way output of the present invention drives the input terminal of the human input device at forward or reverse dual rotary direction through human's foot, and then the output terminal of the human input device transmits the kinetic energy to the input terminal of the clutch type reversible transmission drive device with bidirectional input and one-way output, and the output terminal of the clutch type reversible transmission drive device with bidirectional input and one-way output produces constant rotary direction output to drive the load wheel set, and further to drive the vehicle integrated at the load wheel set; the present invention is applied to pedal vehicles, or mixture of electric and pedal vehicles, or combination of electric and pedal vehicles, especially to a bicycle capable of being pedaled bidirectionally and driven to move in unidirectional, for human's lower limbs pedaling at bi-direction to extend and change the muscle groups, thus achieving the following advantages:

(1) reducing the injured caused by some muscles and joints overused; and (2) employing or training the unused muscles and joints.

The present invention relates to a human input device with dual rotary direction input, in which the output terminal of the device is used to transmit the kinetic energy to the input terminal of the specific clutch type reversible transmission drive device with bidirectional input and one-way output, and the output terminal of the clutch type reversible transmission drive device with bidirectional input and one-way output produces constant rotary direction output to drive the load wheel set, and further to drive the vehicle integrated at the load wheel set; the rider selects the direction of pedal-driven input, and the clutch type reversible transmission drive device with bidirectional input and one-way output with same or different speed ratio produces constant rotary direction output at different driven input direction; and when the load wheel set moves back, the reverse drive caused by back move occurs at output terminal, through releasing the connectable or releasable clutch device, the clutch type reversible transmission bicycle with bidirectional input and one-way output is prevented from being locked.

FIG. 1 is a schematic view showing the basic component blocks of the clutch type reversible transmission bicycle with bidirectional input and one-way output, according to the present invention.

As shown in FIG. 1, which is a structural schematic view of the clutch type reversible transmission bicycle with bidirectional input and one-way output, except for the components of the pedal vehicle and a machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

clutch type reversible transmission drive device with bidirectional input and one-way output (13): which is driven by different rotary direction kinetic energy from the human input device (11), and outputs constant rotary direction kinetic energy; and the clutch type reversible transmission bicycle with bidirectional input and one-way output has the anti-locking function, through releasing the connectable or releasable clutch device (70), when reverse drive caused by back move occurs at the output terminal; in which the transmission components within the clutch type reversible transmission drive device with bidirectional input and one-way output (13) are constituted by one or more of the followings integrated with the connectable or releasable clutch device (70), including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the clutch type reversible transmission drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the clutch type reversible transmission drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

in the gear train structure with dual rotary direction input and same rotary direction output of the clutch type reversible transmission drive device with bidirectional input and one-way output (13), the radial or axial connectable or releasable clutch device (70) is installed at one or more of the following positions, including: between the machine body and the rotatable shell of the gear train with bidirectional input and one-way output; or between the fixed shell and the rotating parts of the gear train with bidirectional input and one-way output; thus when reverse drive caused by back move occurs at the output terminal, through releasing the connectable or releasable clutch device (70), the gear train structure with dual rotary direction input and same rotary direction output is prevented from rigid lock status;

connectable or releasable clutch device (70): related to a mechanism driven to be connected or released by human power, or machine power, or aerodynamic force, or fluid power, or electromagnetic force; and load wheel set (15): directly driven by the output terminal of the clutch type reversible transmission drive device with bidirectional input and one-way output (13), and further driving a vehicle integrated with the load wheel set (15); in which for the clutch type reversible transmission bicycle with bidirectional input and one-way output of the present invention, if it is driven through the human input device (11) by human's foot at the first driving rotary direction, or at the second rotary direction with different rotary direction from the first driving rotary direction, the rotary kinetic energy output from the output terminal of the human input device (11) is transmitted to the input terminal of the clutch type reversible transmission drive device with bidirectional input and one-way output (13) via the additionally installed pre-transmission device (12), and the output terminal of the clutch type reversible transmission drive device with bidirectional input and one-way output (13) outputs rotary kinetic energy with constant rotary direction, to drive the load wheel set (15), and to further drive a vehicle integrated with the load wheel set (15).

Figure 2:
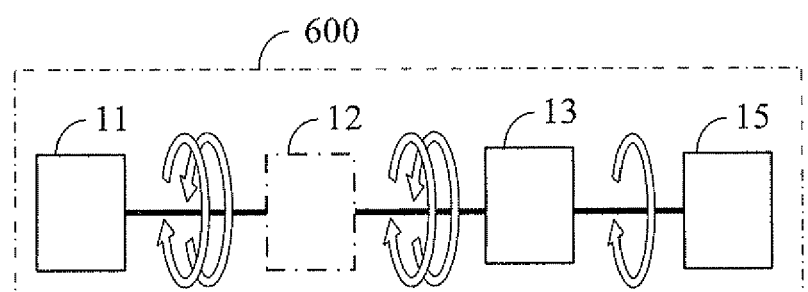
FIG. 2 is a schematic view showing the driving device component blocks, in which a pre-transmission device (12) is additionally installed between a human input device (11) and a clutch type reversible transmission drive device with bidirectional input and one-way output (13) in FIG. 1.

FIG. 2 is a schematic view showing the driving device component blocks, in which a pre-transmission device (12) is additionally installed between a human input device (11) and a clutch type reversible transmission drive device with bidirectional input and one-way output (13) in FIG. 1.

As shown in FIG. 2, which is a structural schematic view of the clutch type reversible transmission bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

pre-transmission device (12): constituted by one or more of the following transmissions including various rotary transmission functional structures, such as gear type, belt type, or friction-type, with constant speed ratio or variable speed ratio; in which the pre-transmission device (12) is driven by the human input device (11) and outputs rotary kinetic energy for driving the clutch type reversible transmission drive device with bidirectional input and one-way output (13);

clutch type reversible transmission drive device with bidirectional input and one-way output (13): which is driven by different rotary direction kinetic energy from the pre-transmission device (12), and outputs constant rotary direction kinetic energy; and the clutch type reversible transmission bicycle with bidirectional input and one-way output has the anti-locking function, through releasing the connectable or releasable clutch device (70), when reverse drive caused by back move occurs at the output terminal; in which the transmission components within the clutch type reversible transmission drive device with bidirectional input and one-way output (13) are constituted by one or more of the followings integrated with the connectable or releasable clutch device (70), including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the clutch type reversible transmission drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the clutch type reversible transmission drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

in the gear train structure with dual rotary direction input and same rotary direction output of the clutch type reversible transmission drive device with bidirectional input and one-way output (13), the radial or axial connectable or releasable clutch device (70) is installed at one or more of the following positions, including: between the machine body and the rotatable shell of the gear train with bidirectional input and one-way output; or between the fixed shell and the rotating parts of the gear train with bidirectional input and one-way output; thus when reverse drive caused by back move occurs at the output terminal, through releasing the connectable or releasable clutch device (70), the gear train structure with dual rotary direction input and same rotary direction output is prevented from rigid lock status;

connectable or releasable clutch device (70): related to a mechanism driven to be connected or released by human power, or machine power, or aerodynamic force, or fluid power, or electromagnetic force; and load wheel set (15): directly driven by the output terminal of the clutch type reversible transmission drive device with bidirectional input and one-way output (13), and further driving a vehicle integrated with the load wheel set (15); in which for the clutch type reversible transmission bicycle with bidirectional input and one-way output, if it is driven through the human input device (11) by human's foot, the rotary kinetic energy output from the output terminal of the human input device (11) is transmitted to the clutch type reversible transmission drive device with bidirectional input and one-way output (13), and the output terminal of the clutch type reversible transmission drive device with bidirectional input and one-way output (13) outputs rotary kinetic energy with constant rotary direction, for the additionally installed rear transmission (14) to drive the load wheel set (15), and to further drive a vehicle integrated with the load wheel set (15).

Figure 3:
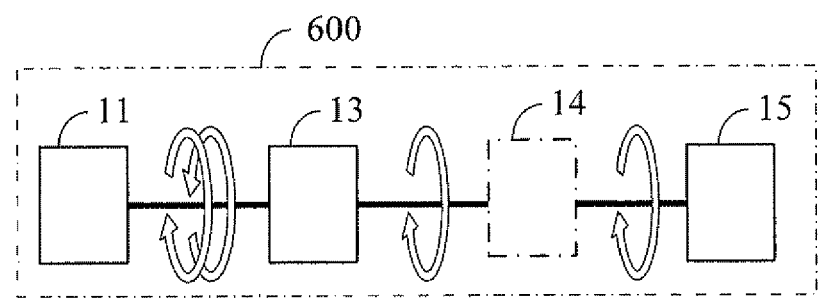
FIG. 3 is a schematic view showing the driving device component blocks, in which a rear transmission (14) is additionally installed between the clutch type reversible transmission drive device with bidirectional input and one-way output (13) and a load wheel set (15) in FIG. 1.

FIG. 3 is a schematic view showing the driving device component blocks, in which a rear transmission (14) is additionally installed between the clutch type reversible transmission drive device with bidirectional input and one-way output (13) and a load wheel set (15) in FIG. 1.

As shown in FIG. 3, which is a structural schematic view of the clutch type reversible transmission bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

clutch type reversible transmission drive device with bidirectional input and one-way output (13): which is driven by different rotary direction kinetic energy from the human input device (11) through the pre-transmission device (12), and outputs constant rotary direction kinetic energy; and the clutch type reversible transmission bicycle with bidirectional input and one-way output has the anti-locking function, through releasing the connectable or releasable clutch device (70), when reverse drive caused by back move occurs at the output terminal; in which the transmission components within the clutch type reversible transmission drive device with bidirectional input and one-way output (13) are constituted by one or more of the followings integrated with the connectable or releasable clutch device (70), including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the clutch type reversible transmission drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the clutch type reversible transmission drive device with bidirectional input and one-way output (13) are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

in the gear train structure with dual rotary direction input and same rotary direction output of the clutch type reversible transmission drive device with bidirectional input and one-way output (13), the radial or axial connectable or releasable clutch device (70) is installed at one or more of the following positions, including: between the machine body and the rotatable shell of the gear train with bidirectional input and one-way output; or between the fixed shell and the rotating parts of the gear train with bidirectional input and one-way output; thus when reverse drive caused by back move occurs at the output terminal, through releasing the connectable or releasable clutch device (70), the gear train structure with dual rotary direction input and same rotary direction output is prevented from rigid lock status;

connectable or releasable clutch device (70): related to a mechanism driven to be connected or released by human power, or machine power, or aerodynamic force, or fluid power, or electromagnetic force; and rear transmission (14): constituted by one or more of the following transmissions including various rotary transmission functional structures, such as gear type, belt type, or friction-type, with constant speed ratio or variable speed ratio, for being driven by the clutch type reversible transmission drive device with bidirectional input and one-way output (13), whereas its output terminal is used to drive the load wheel set (15); and load wheel set (15): directly driven by the output terminal of the rear transmission (14), and further driving a vehicle integrated with the load wheel set (15); in which for the clutch type reversible transmission bicycle with bidirectional input and one-way output of the present invention, if it is driven through the human input device (11) by human's foot, the output terminal outputs rotary kinetic energy transmitted to the input terminal of the clutch type reversible transmission drive device with bidirectional input and one-way output (13) through the additionally installed pre-transmission device (12), and the output terminal of the clutch type reversible transmission drive device with bidirectional input and one-way output (13) outputs constant rotary direction output, and then through the additionally installed rear transmission (14) to drive the load wheel set (15), and to further drive a vehicle integrated with the load wheel set (15).

Figure 4:
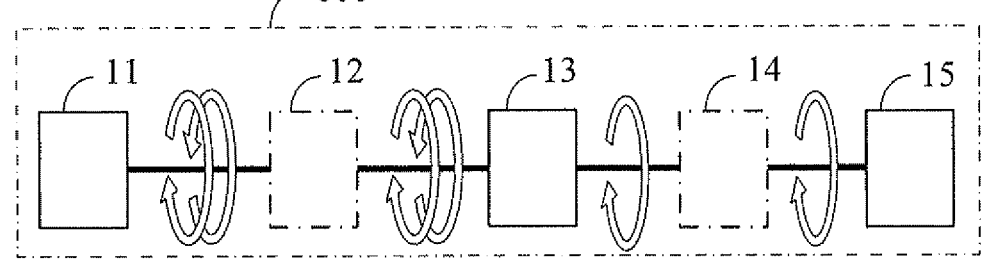
FIG. 4 is a schematic view showing the driving device component blocks, in which the pre-transmission device (12) is additionally installed between the human input device (11) and the clutch type reversible transmission drive device with bidirectional input and one-way output (13), and the rear transmission (14) is additionally installed between the clutch type reversible transmission drive device with bidirectional input and one-way output (13) and the load wheel set (15) in FIG. 1.

FIG. 4 is a schematic view showing the driving device component blocks, in which the pre-transmission device (12) is additionally installed between the human input device (11)

and the clutch type reversible transmission drive device with bidirectional input and one-way output (13), and the rear transmission (14) is additionally installed between the clutch type reversible transmission drive device with bidirectional input and one-way output (13) and the load wheel set (15) in FIG. 1.

As shown in FIG. 4, which is a structural schematic view of the clutch type reversible transmission bicycle with bidirectional input and one-way output, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which
the kinetic energy of the first driving rotary direction and the input kinetic energy of the second driving rotary direction are derived from human's foot for driving the input terminal of the human input device (11);
the first driving rotary direction and the second driving rotary direction are reverse;
pre-transmission device (12): constituted by one or more of the following transmissions including various rotary transmission functional structures, such as gear type, belt type, or friction-type, with constant speed ratio or variable speed ratio; in which
the pre-transmission device (12) is driven by the human input device (11) and outputs rotary kinetic energy for driving the clutch type reversible transmission drive device with bidirectional input and one-way output (13);
clutch type reversible transmission drive device with bidirectional input and one-way output (13): which is driven by different rotary direction kinetic energy from the pre-transmission device (12), and outputs constant rotary direction kinetic energy; and the clutch type reversible transmission bicycle with bidirectional input and one-way output has the anti-locking function, through releasing the connectable or releasable clutch device (70), when reverse drive caused by back move occurs at the output terminal; in which
the transmission components within the clutch type reversible transmission drive device with bidirectional input and one-way output (13) are constituted by one or more of the followings integrated with the connectable or releasable clutch device (70), including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and
when the clutch type reversible transmission drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which
the main transmission structure and operational features of the clutch type reversible transmission drive device with bidirectional input and one-way output (13) are as following:
the first rotary direction and the second rotary direction are reverse;
if the input terminal is driven by the first rotary direction, the first rotary direction output is produced through the first transmission gear train driving the output terminal;
if the input terminal is driven by the second rotary direction, the first rotary direction output is produced through the second transmission gear train driving the output terminal;
an one-way transmission is installed between the first transmission gear train and the second transmission gear train to avoid the interference from the second transmission gear train when the first transmission gear train is used to be the first rotary direction input and produces the first rotary direction output;
an one-way transmission is installed between the second transmission gear train and the first transmission gear train to avoid the interference from the first transmission gear train when the second transmission gear train is used to be the second rotary direction input and produces the first rotary direction output;
in the gear train structure with dual rotary direction input and same rotary direction output of the clutch type reversible transmission drive device with bidirectional input and one-way output (13), the radial or axial connectable or releasable clutch device (70) is installed at one or more of the following positions, including: between the machine body and the rotatable shell of the gear train with bidirectional input and one-way output; or between the fixed shell and the rotating parts of the gear train with bidirectional input and one-way output; thus when reverse drive caused by back move occurs at the output terminal, through releasing the connectable or releasable clutch device (70), the gear train structure with dual rotary direction input and same rotary direction output is prevented from rigid lock status;
connectable or releasable clutch device (70): related to a mechanism driven to be connected or released by human power, or machine power, or aerodynamic force, or fluid power, or electromagnetic force;
rear transmission (14): constituted by one or more of the following transmissions including various rotary transmission functional structures, such as gear type, belt type, or friction-type, with constant speed ratio or variable speed ratio, for being driven by the clutch type reversible transmission drive device with bidirectional input and one-way output (13), whereas its output terminal is used to drive the load wheel set (15); and
load wheel set (15): directly driven by the output terminal of the rear transmission (14), and further driving a vehicle integrated with the load wheel set (15).

For the clutch type reversible transmission bicycle with bidirectional input and one-way output of the present invention, except for the related components, machine body and the load wheel set of the driven vehicle installed, it is characterized by capable of connecting or releasing the function of bi-direction input and one-way output, and the components and operational features of the clutch type reversible transmission drive device with bidirectional input and one-way output (13) are provided for describing the feasibility;

The installed clutch type reversible transmission drive device with bidirectional input and one-way output (13) in the clutch type reversible transmission bicycle with bidirectional input and one-way output of the present invention, whose operational features are as following:
the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

the connectable or releasable clutch device (70) is installed between the transmissions at the kinetic chain from the input terminal to the output terminal of the clutch type reversible transmission drive device with bidirectional input and one-way output (13), including: 1) the radial or axial connectable or releasable clutch device (70) is installed between the transmissions at the kinetic chain from the input terminal to the output terminal of the first transmission gear train driven by the first rotary direction input; and/or 2) the radial or axial connectable or releasable clutch device (70) is coaxially installed between the transmissions at the kinetic chain from the input terminal to the output terminal of the second transmission gear train driven by the second rotary direction input; and the connectable or releasable clutch device (70) is installed between the transmissions of the clutch type reversible transmission drive device with bidirectional input and one-way output (13), when the output side drives the input side at reverse rotary direction, through releasing the connectable or releasable clutch device (70), the gear train with bidirectional input and one-way output is prevented from rigid lock status.

Figure 5:
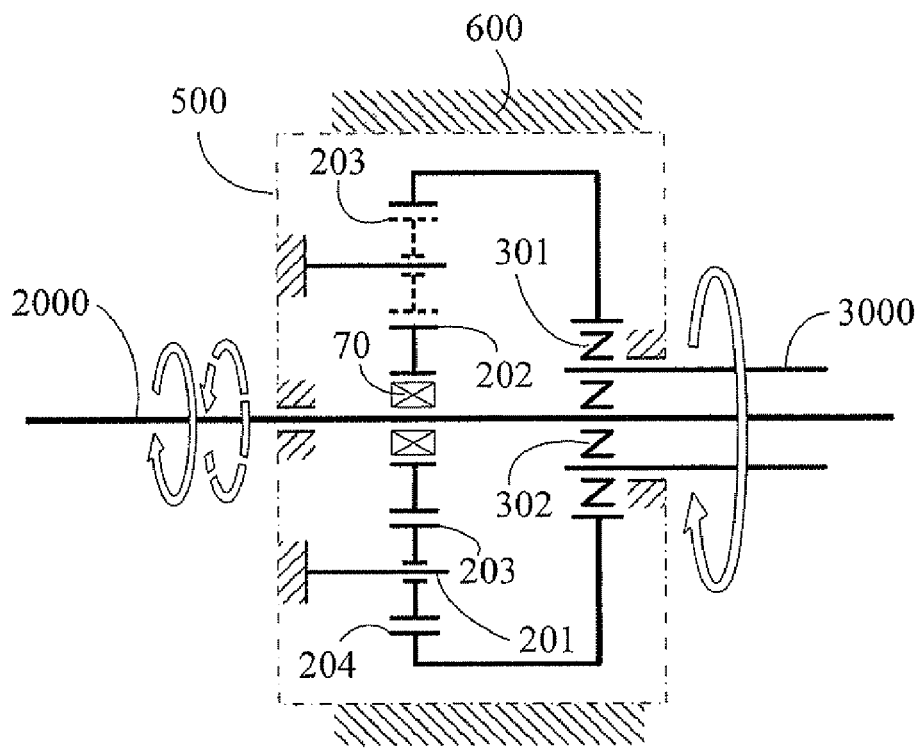
FIG. 5 is a schematic structural view showing the first embodiment of the clutch type reversible transmission drive device with bidirectional input and one-way output (13)
Figure 6:
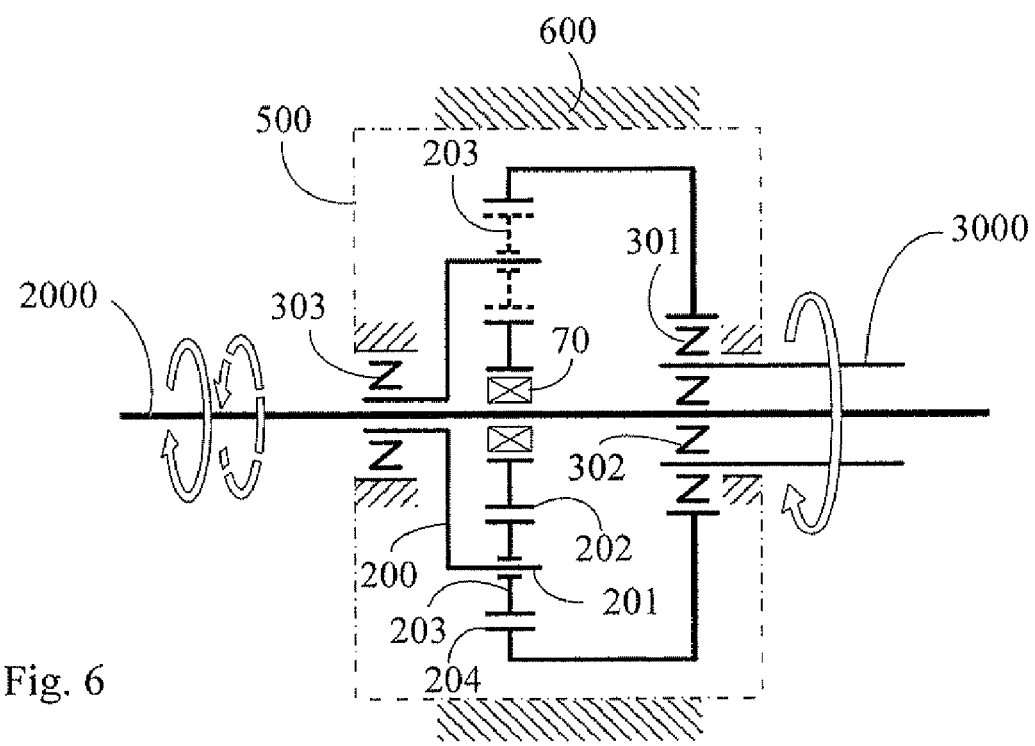
FIG. 6 is a schematic structural view showing the second embodiment of the clutch type reversible transmission drive device with bidirectional input and one-way output (13)
Figure 7:
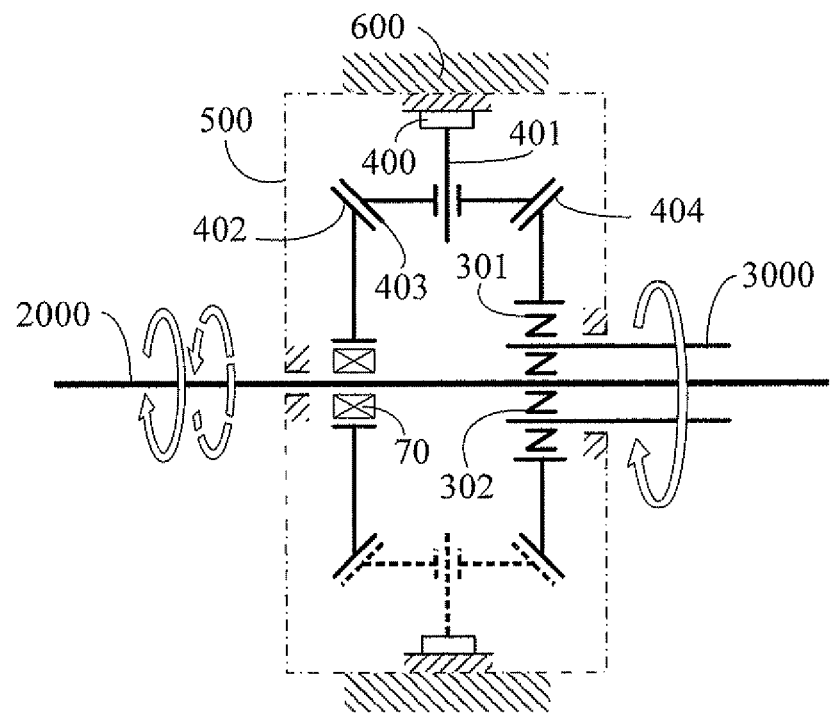
FIG. 7 is a schematic structural view showing the third embodiment of the clutch type reversible transmission drive device with bidirectional input and one-way output (13)
Figure 8:
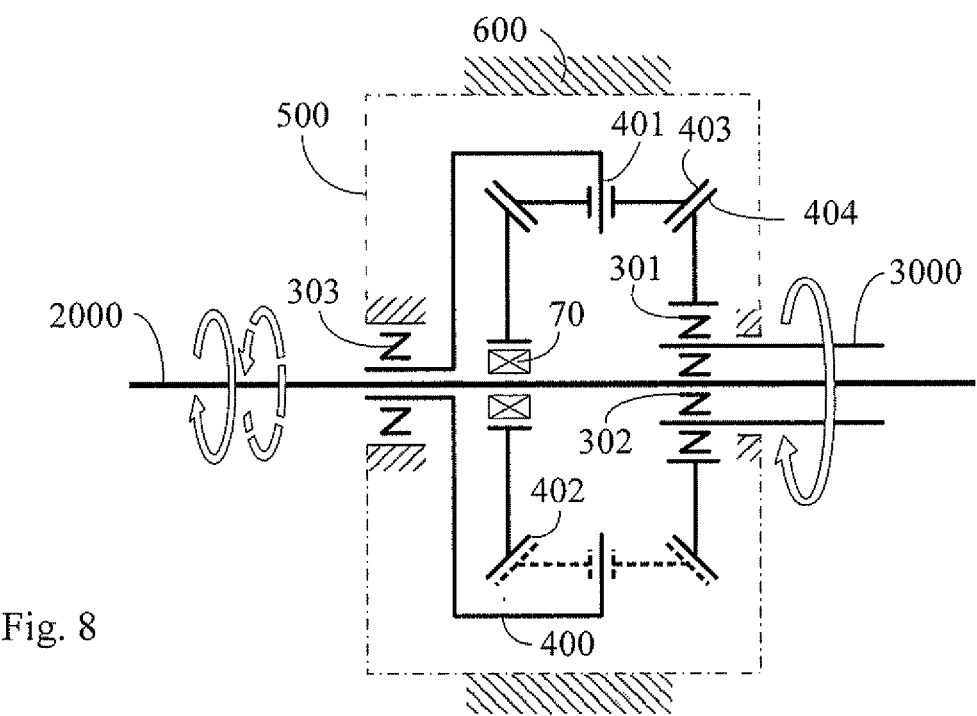
FIG. 8 is a schematic structural view showing the 4th embodiment of the clutch type reversible transmission drive device with bidirectional input and one-way output (13)

In the clutch type reversible transmission bicycle with bidirectional input and one-way output of the present invention, the embodiments of the clutch type reversible transmission drive device with bidirectional input and one-way output (13) used are shown as FIGS. 5 to 12, including:

A) as shown in FIGS. 5 to 6, which is constituted by a planetary gear train;

B) as shown in FIGS. 7 to 8, which is constituted by an epicyclic gear train; and C) as shown in FIGS. 9 to 12, which is integrated constituted by a transmission with different transmission rotary directions.

FIG. 5 is a schematic structural view showing the first embodiment of the clutch type reversible transmission drive device with bidirectional input and one-way output (13).

As shown in FIG. 5, the clutch type reversible transmission bicycle with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (70);

the planetary wheel (203) is installed between the outer wheel (204) and the sun wheel (202); the center of the planetary wheel (203) rotates at the planetary wheel shaft (201), and one end of the planetary wheel shaft (201) is fixed at the shell of the transmission gear train (500);

the shell of the transmission gear train (500) is fixed installed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of using the sun wheel (202) to drive the planetary wheel (203) includes acceleration, deceleration, or constant velocity;

the relation of the transmission ratio of using the planetary wheel (203) to drive the outer wheel (204) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the sun wheel (202) for further driving the planetary wheel (203) and the outer wheel (204), and through the ring structure of the outer wheel (204) and the one-way transmission (301) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

FIG. 6 is a schematic structural view showing the second embodiment of the clutch type reversible transmission drive device with bidirectional input and one-way output (13).

As shown in FIG. 6, the clutch type reversible transmission bicycle with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a rotational structure of the planetary wheel support arm annular shelf (200) and the one-way transmission (303), while the other end of the input shaft (2000) perforates through the output shaft (3000) via the one-way transmission (302), and a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (70);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates between the input shaft (2000) and the one-way transmission (303);

the shell of the transmission gear train (500) is fixed installed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of using the sun wheel (202) to drive the planetary wheel (203) includes acceleration, deceleration, or constant velocity;

the relation of the transmission ratio of using the planetary wheel (203) to drive the outer wheel (204) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the sun wheel (202) for further driving the planetary wheel (203) and the outer wheel (204), and through the ring structure of the outer wheel (204) and the one-way transmission (301) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

FIG. 7 is a schematic structural view showing the third embodiment of the clutch type reversible transmission drive device with bidirectional input and one-way output (13).

As shown in FIG. 7, the clutch type reversible transmission bicycle with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (70);

the epicyclic gear (403) is installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400), and the epicyclic gear support arm annular shelf (400) is fixed at the shell of the transmission gear train (500);

the shell of the transmission gear train (500) is fixed installed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio of using the inner bevel wheel (402) to drive the epicyclic gear (403) includes acceleration, deceleration, or constant velocity;

the relation of the transmission ratio of using the epicyclic gear (403) to drive the outer bevel wheel (404) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the inner bevel wheel (402) for further driving the epicyclic gear (403) and the outer bevel wheel (404), and through the outer bevel wheel (404) and the one-way transmission (301) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

FIG. 8 is a schematic structural view showing the 4th embodiment of the clutch type reversible transmission drive device with bidirectional input and one-way output (13).

As shown in FIG. 8, the clutch type reversible transmission bicycle with bidirectional input and one-way output of the present invention is constituted by the epicyclic gear train with the input shaft and the output shaft coaxial fitting, the main components including:

one end of the input shaft (2000) is through installed at the epicyclic gear support arm annular shelf (400) via a bearing structure, the epicyclic gear support arm annular shelf (400) is integrated with one side of the shell of the transmission gear train (500) via the one-way transmission (303), while the other end of the input shaft (2000) perforates through the output shaft (3000) via the one-way transmission (302), and a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (70);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the epicyclic gear support arm annular shelf (400) rotates between the input shaft (2000) and the one-way transmission (303);

the shell of the transmission gear train (500) is fixed installed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of using the inner bevel wheel (402) to drive the epicyclic gear (403) includes acceleration, deceleration, or constant velocity;

the relation of the transmission ratio of using the epicyclic gear (403) to drive the outer bevel wheel (404) includes acceleration, deceleration, or constant velocity;

by way of the above structures, the input shaft (2000) is driven at the first rotary direction, and it is through the one-way transmission (302) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the inner bevel wheel (402), the epicyclic gear (403), and the outer bevel wheel (404), and then through the one-way transmission (301) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

Figure 9:
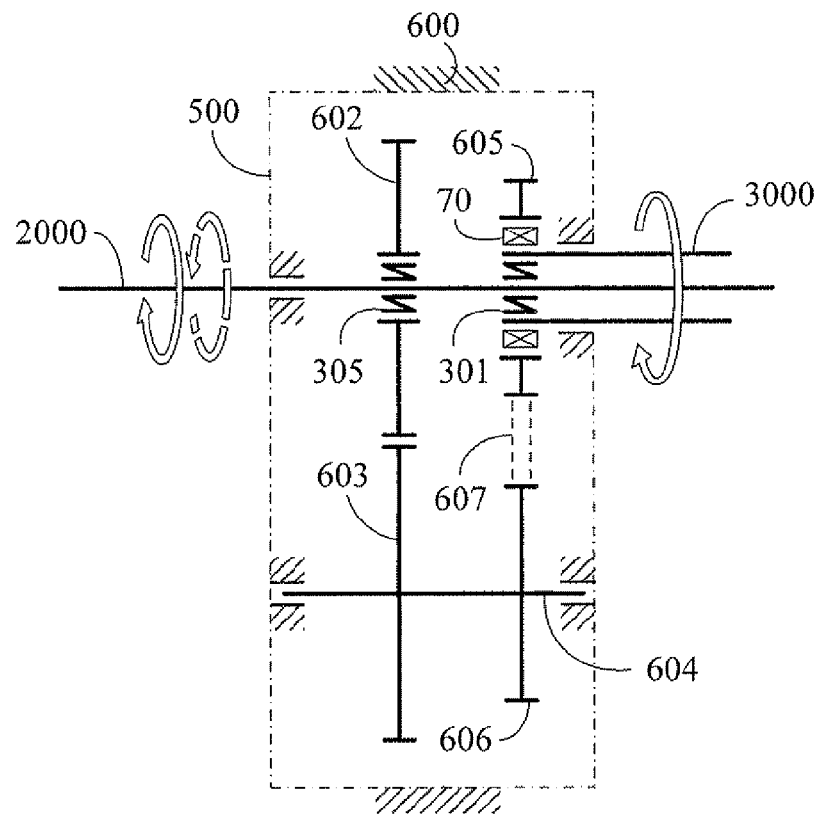
FIG. 9 is a schematic structural view showing the 5th embodiment of the clutch type reversible transmission drive device with bidirectional input and one-way output (13)

FIG. 9 is a schematic structural view showing the 5th embodiment of the clutch type reversible transmission drive device with bidirectional input and one-way output (13).

As shown in FIG. 9, the clutch type reversible transmission bicycle with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the driving wheel (602);

the rotary direction of driving wheel (602) is different from that of driving wheel (603), the driving wheel (603) and the driving wheel (606) are co-integrated with the revolving shaft (604), and a bearing is installed between the revolving shaft (604) and the shell of the transmission gear train (500);

the driving wheel (606) and the driving wheel (605) is constituted by the pulley or the sprocket, which are transmitted by the transmission belt (607) to constitute a driving wheel set with the same rotary direction;

the connectable or releasable clutch device (70) is installed between the driving wheel (605) and the output shaft (3000);

the shell of the transmission gear train (500) is fixed installed at the machine body (600);

the driving wheels (602) and (603) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction are constituted by the transmission belts, pulleys (such as toothed belt or steel belt), or sprockets with chains;

by way of the above structures, the input shaft (2000) is driven at the first rotary direction, and it is through the one-way transmission (301) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the one-way transmission (305) driving the driving wheel (602), and then through the driving wheel (602) driving the driving wheel (603) and the driving wheel (606), and further through the driving wheel (606) driving the driving wheel (605), and then via the connectable or releasable clutch device (70) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

Figure 10:
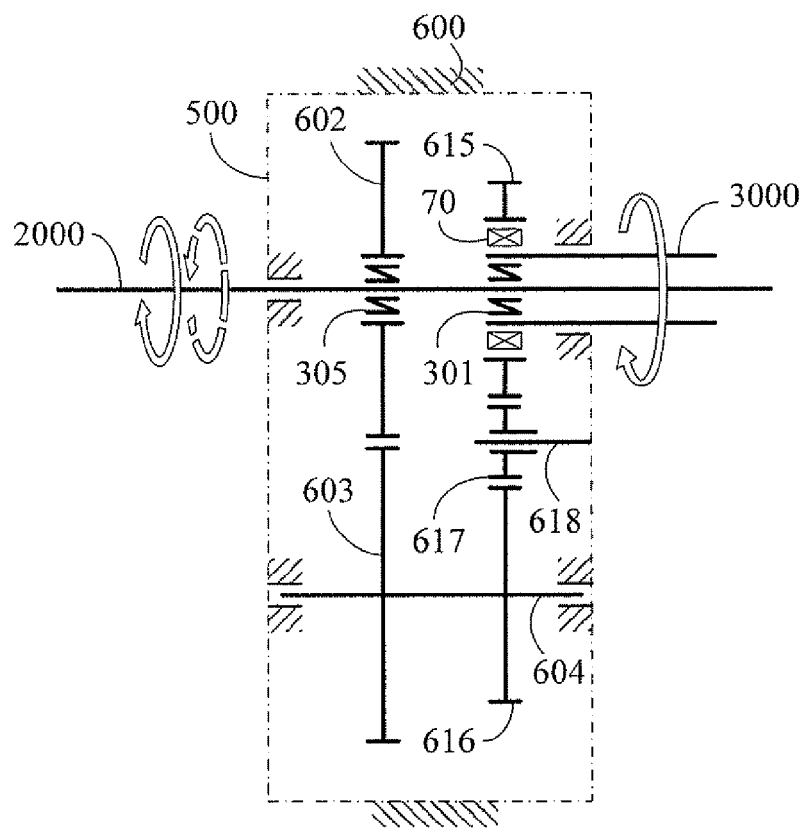
FIG. 10 is a schematic structural view showing the 6th embodiment of the clutch type reversible transmission drive device with bidirectional input and one-way output (13)

FIG. 10 is a schematic structural view showing the 6th embodiment of the clutch type reversible transmission drive device with bidirectional input and one-way output (13).

As shown in FIG. 10, the clutch type reversible transmission bicycle with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), a bearing is installed between the output shaft (3000) and the shell of the transmission gear train (500);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the driving wheel (602);

the driving wheel (602) and the driving wheel (603) are in different rotary directions, the driving wheel (603) and the driving wheel (616) are co-integrated with the revolving shaft (604), and a bearing is installed between the revolving shaft (604) and the shell of the transmission gear train (500);

the driving wheel (616) is through the driving wheel (617) rotating at the revolving shaft (618) to drive the driving wheel (615) for constituting a driving wheel set with the same rotary direction;

the revolving shaft (618) is integrated with the shell of the transmission gear train (500);

the connectable or releasable clutch device (70) is installed between the driving wheel (615) and the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction are constituted by the gear set including an idler wheel or by the internal gear set;

by way of the above structures, the input shaft (2000) is driven at the first rotary direction, and it is through the one-way transmission (301) for driving the output shaft (3000) to produce the first rotary direction output, therefore to constitute the first transmission gear train;

by way of the above structures, if the connectable or releasable clutch device (70) is locked, the input shaft (2000) is driven at the second rotary direction, and it is through the one-way transmission (305) driving the driving wheel (602), and through the driving wheel (602) driving the driving wheel (603) and the driving wheel (616), and then through the driving wheel (616) via the driving wheel (617) for further driving the driving wheel (615), and further through the driving wheel (615) via the connectable or releasable clutch device (70) for driving the output shaft (3000) to produce the first rotary direction output, therefore to constitute the second transmission gear train; and when reverse drive caused by back move occurs at the output shaft (3000), through releasing the connectable or releasable clutch device (70), the first transmission gear train and the second transmission gear train are prevented from lock status.

Figure 11:
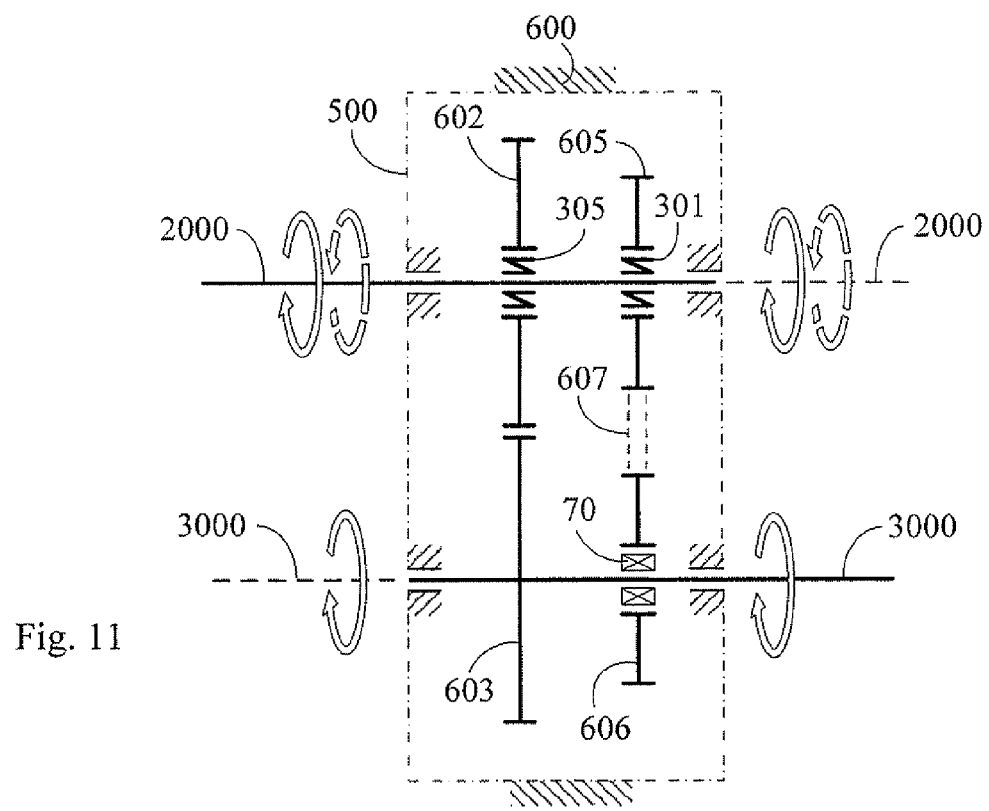
FIG. 11 is a schematic structural view showing the 7th embodiment of the clutch type reversible transmission drive device with bidirectional input and one-way output (13)

FIG. 11 is a schematic structural view showing the 7th embodiment of the clutch type reversible transmission drive device with bidirectional input and one-way output (13).

Figure 12:
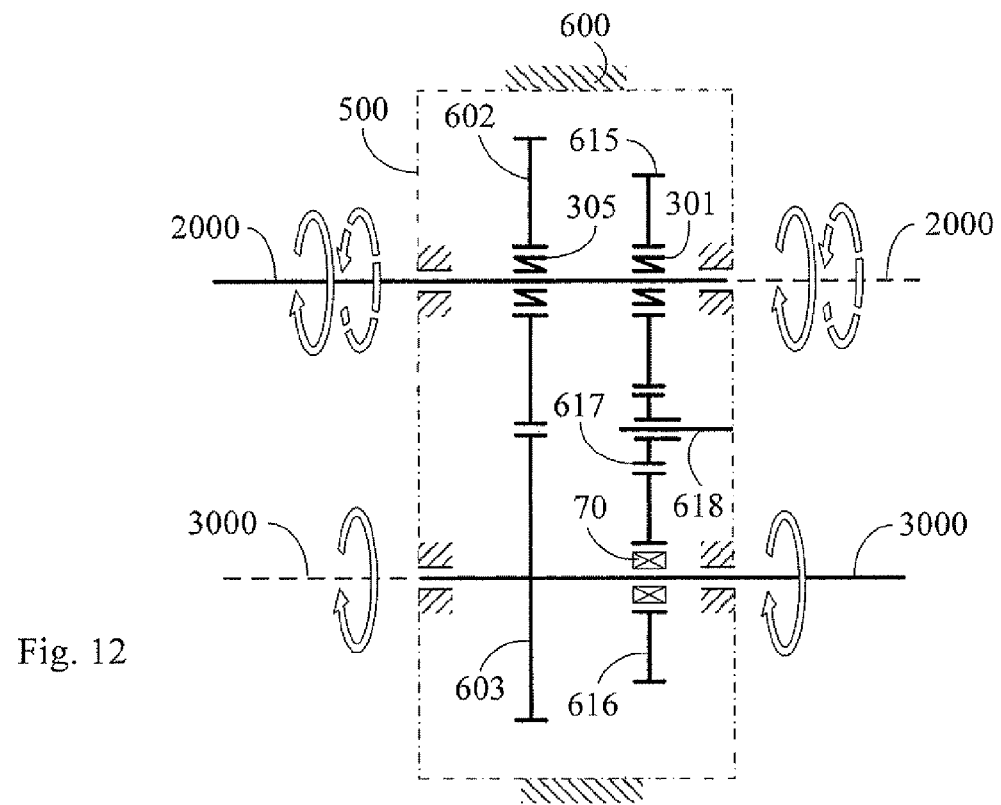
FIG. 12 is a schematic structural view showing the 8th embodiment of the clutch type reversible transmission drive device with bidirectional input and one-way output (13).

As shown in FIG. 11, the clutch type reversible transmission bicycle with bidirectional input and one-way output is constituted by integrating with the transmissions with different drive rotating directions, in which the input shaft and the output shaft have different axes, the main components including:

one end of the input shaft (2000) is through installed at one side of the shell of the transmission gear train (500) via a bearing structure, while the other end of the input shaft (2000) perforates through the driving wheel (605) via the one-way transmission (301), a bearing is installed between the another end of the input shaft (2000) and the shell of the transmission gear train (500), and the rotary power source is inputted through one or two ends of the input shaft (2000);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the driving wheel (602);

the driving wheel (602) and the driving wheel (603) are in different rotary directions, the driving wheel (603) is integrated with the output shaft (3000), the driving wheel (606) is integrated with the output shaft (3000) via the connectable or releasable clutch device (70), and a bearing is installed between the output shaft (3000) and the shell of the transmission gear train (500);

the driving wheel (605) and the driving wheel (606) are constituted by the pulley or the sprocket, which are transmitted by the transmission belt (607), to constituted a driving wheel set with the same rotary direction;

the connectable or releasable clutch device (70) is installed between the driving wheel (606) and the output shaft (3000);

the shell of the transmission gear train (500) is fixed installed at the machine body (600);

the driving wheels (602) and (603) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction is constituted by transmission belts, pulleys (such as toothed belt or steel belt), or sprockets with chains;

by way of the above structures, if the connectable or releasable clutch device (70) is locked, the input shaft (2000) is driven at the first rotary direction, and it is through the one-way transmission (301) for driving the driving wheel (605), and through the transmission belt (607) for driving the driving wheel (606), and then through the connectable or releasable clutch device (70) for driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and then through the driving wheel (602) driving the driving wheel (603) for driving the output shaft (3000) to produce the first rotary direction output, therefore to constitute the second transmission gear train;

when reverse drive caused by back move occurs at the output shaft (3000), through releasing the connectable or releasable clutch device (70), the first transmission gear train and the second transmission gear train are prevented from lock status; and one or two ends of the output shaft (3000) are arranged for executing output. FIG. 12 is a schematic structural view showing the 8th embodiment of the clutch type reversible transmission drive device with bidirectional input and one-way output (13).

As shown in FIG. 12, the clutch type reversible transmission bicycle with bidirectional input and one-way output of the present invention is constituted by integrating with the transmissions with different drive rotating directions, in which the input shaft and the output shaft have different axes, the main components including:

one end of the input shaft (2000) is through installed at one side of the shell of the transmission gear train (500) via a bearing structure, while the other end of the input shaft (2000) perforates through the driving wheel (615) via the one-way transmission (301), a bearing is installed between the other end of the input shaft (2000) and the shell of the transmission gear train (500), and the rotary power source is inputted from one or two ends of the input shaft (2000);

connectable or releasable clutch device (70): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the driving wheel (602);

the driving wheel (615) drives the driving wheel (616) via the driving wheel (617), the driving wheel (616) is integrated with the output shaft (3000) via the connectable or releasable clutch device (70), and a bearing is installed between the output shaft (3000) and the shell of the transmission gear train (500);

the driving wheel (617) rotates at the revolving shaft (618), and the revolving shaft (618) is installed at the shell of the transmission gear train (500);

the driving wheel (602) and the driving wheel (603) are in different rotary directions;

the driving wheel (603) is integrated with the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary direction includes acceleration, deceleration, or constant velocity;

the relation of the transmission ratio in the driving wheel set with the same rotary direction includes acceleration, deceleration, or constant velocity;

the driving wheel set with the same rotary direction is constituted by the gear set including an idler wheel or by the internal gear set;

by way Of the above structures, the input shaft (2000) is driven at the first rotary direction, and it is through the one-way transmission (301) for driving the driving wheel (615), and through the transmission belt (617) for driving the driving wheel (616), and then through the connectable or releasable clutch device (70) in connected status for driving the output shaft (3000) to produce the first rotary direction output, therefore to constitute the first transmission gear train;

by way of the above structures, the input shaft (2000) is driven at the second rotary direction, and it is through the one-way transmission (305) driving the driving wheel (602), and through the driving wheel (602) driving the driving wheel (603), and then through the driving wheel (603) driving the output shaft (3000) to produce the first rotary direction output to, therefore constitute the second transmission gear train;

when reverse drive caused by back move occurs at the output shaft (3000), through releasing the connectable or releasable clutch device (70), the first transmission gear train and the second transmission gear train are prevented from lock status; and one or two ends of the output shaft (3000) are arranged for executing output.

The invention claimed is:

1. A pedal driven vehicle including:

a human input device (11) for converting movements by a human into a forward or reverse direction rotational movement;

a load wheel set (15); and a reversible transmission mechanism (13) including a clutch device (70), said transmission mechanism having a bidirectional input connected to the human input device and a one-way output connected to the wheel set such that the transmission mechanism produces a same constant rotary direction output to the wheel set while allowing a rider to selectively pedal in different directions; and wherein when a wheel of said wheel set is subject to an external force that acts in a direction opposite the direction of the one-way output, the clutch device is released to prevent locking of the transmission mechanism, wherein when the bidirectional input is in a first rotary direction, power to the output is transmitted by a first one-way transmission set that rotates in said first rotary direction, and when the bidirectional input is in a second rotary direction, power to the output is transmitted by a second one-way transmission set that converts said rotation in said second direction into an output rotation in said first direction, and wherein said clutch devices disengages said first and second one-way transmission sets from said one-way output.

2. A pedal driven vehicle as claimed in claim 1, wherein said human input device includes one of: (a) a foot pedal and crank, and (b) a handle and hand shank.

3. A pedal driven vehicle as claimed in claim 1, wherein when the bidirectional input is in a first rotary direction, power to the output is transmitted by a first transmission gear train that rotates in said first rotary direction, and when the bidirectional input is in a second rotary direction, power to the output is transmitted by a second transmission gear train that also rotates in said first direction, said first and second transmission gear trains being connected by one-way transmissions arranged to avoid interference between the first and second transmission gear trains.

4. A pedal driven vehicle as claimed in claim 3, wherein said clutch device is a radially or axially connectable or releasable clutch connected between a machine body and a shell that rotates with the one-way transmission sets; between a fixed shell and rotating parts of the one-way transmission sets.

5. A pedal driven vehicle as claimed in claim 3, wherein said clutch device is arranged to disengage at least one of said first and second gear trains from the bi-directional input or the one-way output.

6. A pedal driven vehicle as claimed in claim 1, wherein the transmission mechanism includes transmission components selected from the group consisting of a gear set; friction wheel set; chain and sprocket set; belt and pulley set; transmission crank and wheel set; fluid transmission unit; and electromagnetic force actuator.

7. A pedal driven vehicle as claimed in claim 1, wherein the transmission mechanism has a same or different fixed speed ratio, or a variable speed ratio, between the bidirectional input and the one-way output.

8. A pedal driven vehicle as claimed in claim 1, further comprising a gear-type, belt-type, or friction-type pre-transmission device (12) for transmitting power between the human input device and the bi-directional input of the reversible transmission mechanism.

9. A pedal driven vehicle as claimed in claim 1, further comprising a rear transmission (14) connected between the one-way output of the reversible transmission mechanism and at least one wheel of the load wheel set.

10. A pedal driven vehicle as claimed in claim 1, wherein said bi-directional input is an input shaft (2000) and said one-way output is an output shaft (3000) that is coaxial with the input shaft, said input shaft and output shaft being connected by a transmission gear train (500) and by a one-way transmission (302), a bearing being installed by between the shell planetary gear trains and the output shaft.

11. A pedal driven vehicle as claimed in claim 10, wherein the transmission gear train includes a planetary gear train, and a sun wheel (202) of the planetary gear train is connected to the input shaft via the clutch device, and a ring gear (204) of the planetary gear train being connected to the output shaft via a one-way transmission (301).

12. A pedal driven vehicle as claimed in claim 11, wherein planetary wheels (203) of the planetary gear train have shafts fixed to a shell of the transmission gear train.

13. A pedal driven vehicle as claimed in claim 11, wherein planetary wheels (203) of the planetary gear trains are installed on a planetary wheel support arm annular shelf (200) arranged to rotate between the input shaft and a one-way transmission (303), said one-way transmission (303) being between the annular shaft and a shell of the transmission gear train.

14. A pedal driven vehicle as claimed in claim 11, wherein a transmission ratio of the planetary gear trains provides acceleration, deceleration, or constant velocity.

15. A pedal driven vehicle as claimed in claim 1, wherein said clutch device is arranged to be connected and released by human power, machine power, aerodynamic force, fluid power, or electromagnetic force.

16. A pedal driven vehicle as claimed in claim 1, wherein said bi-directional input is an input shaft (2000) and said one-way output is an output shaft (3000) that is coaxial with the input shaft, said input shaft and output shaft being connected by a transmission gear train (500) and by a one-way transmission (302), a bearing being installed by between the shell planetary gear trains and the output shaft, said transmission gear train including at least two pairs of bevel gears (402,403) (404) and an epicyclic gear shaft (401), and said clutch device being installed between the bevel gear (402) and the input shaft.

17. A pedal driven vehicle as claimed in claim 16, wherein said epicyclic gear shaft is fixed to a shell of the transmission gear train.

18. A pedal driven vehicle as claimed in claim 16, wherein said epicyclic gear shaft is supported by a wheel support arm annular shelf (400) arranged to rotate between the input shaft and a one-way transmission (303), said one-way transmission (303) being between the annular shaft and a shell of the transmission gear train.

19. A pedal driven vehicle as claimed in claim 1, wherein said bi-directional input is an input shaft (2000) and said one-way output is an output shaft (3000) that is coaxial with the input shaft, said input shaft and output shaft being connected by a one-way transmission (305), driving wheel (602), second driving wheel (603) having a rotating direction different than driving wheel (602), a third shaft (604) that rotates with the second driving wheel and a third driving wheel (606), and a transmission device (607) connected between the third driving wheel and a fourth driving wheel (605), said clutch device being connected between the fourth driving wheel and the output shaft.

20. A pedal driven vehicle as claimed in claim 1, wherein said bi-directional input is an input shaft (2000) and said one-way output is an output shaft (3000) that is coaxial with the input shaft, said input shaft and output shaft being connected by a one-way transmission (305), driving wheel (602), second driving wheel (603) having a rotating direction different than driving wheel (602), a third shaft (604) that rotates with the second driving wheel and a third driving wheel (616), a transmission driving wheel (617) mounted on a shaft (618) fixed to a shell, said transmission driving wheel (617) being connected between the third driving wheel and a fourth driving wheel (615), said clutch device being connected between the fourth driving wheel and the output shaft.

21. A pedal driven vehicle as claimed in claim 1, wherein said bi-directional input is an input shaft (2000) connected by a one-way transmission (305) to a driving wheel (602), said driving wheel (602) being connected to second driving wheel (603) having a rotating direction different than driving wheel (603), said second driving wheel (603) being connected to an output shaft (3000), said output shaft (3000) also being connected to said input shaft (2000) by a third driving wheel (606), and a transmission device (607) connected between the third driving wheel and a fourth driving wheel (605), said clutch device being connected between the third driving wheel and the output shaft.

22. A pedal driven vehicle as claimed in claim 1, wherein said bi-directional input is an input shaft (2000) connected by a one-way transmission (305) to a driving wheel (602), said driving wheel (602) being connected to second driving wheel (603) having a rotating direction different than driving wheel (602), said second driving wheel (603) being connected to an output shaft (3000), said output shaft (3000) also being connected to said input shaft (2000) by a third driving wheel (616) and a transmission driving wheel (617) mounted on a shaft (618) fixed to a shell, said transmission driving wheel (617) being connected between the third driving wheel and a fourth driving wheel (615), said clutch device being connected between the third driving wheel and the output shaft.

\* \* \* \* \*